(12) United States Patent
Kojima et al.

(10) Patent No.: US 11,247,305 B2
(45) Date of Patent: Feb. 15, 2022

(54) NUMERICAL CONTROL DEVICE AND NUMERICAL CONTROL METHOD FOR MACHINE TOOL

(71) Applicant: OKUMA CORPORATION, Niwa-Gun (JP)

(72) Inventors: Takuya Kojima, Niwa-Gun (JP); Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 566 days.

(21) Appl. No.: 16/113,206

(22) Filed: Aug. 27, 2018

(65) Prior Publication Data

US 2019/0084112 A1    Mar. 21, 2019

(30) Foreign Application Priority Data

Sep. 15, 2017 (JP) ............................. JP2017-178070

(51) Int. Cl.
  *B23Q 17/22* (2006.01)
  *B23Q 15/24* (2006.01)
  (Continued)

(52) U.S. Cl.
  CPC ......... *B23Q 17/2275* (2013.01); *B23Q 15/24* (2013.01); *B23Q 15/26* (2013.01);
  (Continued)

(58) Field of Classification Search
  None
  See application file for complete search history.

(56) References Cited

U.S. PATENT DOCUMENTS 8,350,514 B2  1/2013  Otsuki et al.
9,002,502 B2  4/2015  Matsushita
(Continued)

FOREIGN PATENT DOCUMENTS

CN  102331743 A  1/2012
CN  102736559 A  10/2012
(Continued)

OTHER PUBLICATIONS

Japanese Office Action (Application No. 2017-178070) dated Mar. 30, 2021 (with English translation).
(Continued)

*Primary Examiner* — Brent A. Fairbanks
(74) *Attorney, Agent, or Firm* — Burr & Brown, PLLC

(57) ABSTRACT

A numerical control device for a machine tool controls a machine tool having a main spindle for attaching a tool, a table holding a workpiece and a jig, three translational axes, and one or more rotation axis. The numerical control device includes an axis-dependent deformation error estimation unit, an input unit, a gravitational deformation estimation unit, a correction value calculation unit, and an addition unit. The correction value calculation unit calculates a correction value of the translational axes and/or the rotation axis with respect to an error of a position and/or a posture of the tool with respect to the workpiece, based on an estimated value of an axis-dependent deformation error, an estimated value of a gravitational deformation error, and command values. The addition unit adds the correction values to the command values.

12 Claims, 4 Drawing Sheets

(51) Int. Cl.
*B23Q 15/26* (2006.01)
*B25J 9/00* (2006.01)

(52) U.S. Cl.
CPC .... *B25J 9/0096* (2013.01); *G05B 2219/41114* (2013.01); *G05B 2219/49186* (2013.01)

(56) References Cited

U.S. PATENT DOCUMENTS

| | | |
|---|---|---|
| 2005/0166412 A1 | 8/2005 | Ogura et al. |
| 2011/0040523 A1* | 2/2011 | Matsushita .......... B23Q 1/5437 702/152 |
| 2015/0177090 A1* | 6/2015 | Nakahama ............ G01M 1/122 73/65.01 |
| 2017/0010600 A1* | 1/2017 | Shimizu ............... G05B 19/404 |
| 2018/0169854 A1* | 6/2018 | Shiratsuchi ................ B25J 9/10 |

FOREIGN PATENT DOCUMENTS

| | | | | |
|---|---|---|---|---|
| DE | 102015113890 A1 * | 2/2017 | ........... | G05B 19/404 |
| JP | 2005-214943 A1 | 8/2005 | | |
| JP | 2009-104316 A1 | 5/2009 | | |
| JP | 2009-104317 A1 | 5/2009 | | |
| JP | 2011-038902 A1 | 2/2011 | | |

OTHER PUBLICATIONS

Chinese Office Action (with English translation), Chinese Application No. 201811067636.2, dated Apr. 25, 2021 (19 pages).

* cited by examiner

NUMERICAL CONTROL DEVICE AND NUMERICAL CONTROL METHOD FOR MACHINE TOOL

BACKGROUND OF THE INVENTION

This application claims the benefit of Japanese Patent Application Number 2017-178070 filed on Sep. 15, 2017, the entirety of which is incorporated by reference.

FIELD OF THE INVENTION

The disclosure relates to a numerical control device and a numerical control method to correct a deformation of a machine tool caused by a mass of a workpiece.

RELATED ART

FIG. 1 is a schematic diagram of a five-axis-control machining center that includes three translational axes and two rotation axes. A motion of two degrees of freedom for translation of a main spindle head 2 in an X-axis and a Z-axis, which are the translational axes and are orthogonal to one another, is possible with respect to a bed 1. A motion of one degree of freedom for rotation of a table 3 in a C-axis, which is the rotation axis, is possible with respect to a cradle 4. A motion of one degree of freedom for rotation of the cradle 4 in an A-axis, which is the rotation axis, is possible with respect to a trunnion 5. The A-axis and the C-axis are orthogonal to one another. Furthermore, a motion of one degree of freedom for translation of the trunnion 5 in a Y-axis, which is the translational axis and orthogonal to the X-axis and the Z-axis, is possible with respect to the bed 1. Accordingly, the motions of the three degrees of freedom for translation and the two degrees of freedom for rotation of the main spindle head 2 are possible with respect to the table 3. Servo motors, which are controlled by a numerical control device (not illustrated), drive respective feed shafts. A material to be worked is fixed to the table 3, a tool is installed to the main spindle head 2 and rotated, and a relative position and a relative posture between the workpiece and the tool are controlled, thus ensuring machining.

For example, there is a geometric error between the respective axes such as an error in center position of the rotation axis (a displacement from an assumed position) and a tilt error of the rotation axes (squareness and parallelism between the axes) as a factor of affecting motion accuracy of this five-axis machine. The geometric errors deteriorate the motion accuracy of the machine, thus deteriorating machining accuracy. In view of this, although the geometric errors need to be reduced through adjustment, it is difficult to zero the geometric errors. Performing a control to correct the geometric error makes highly-accurate machining possible.

As means to measure the geometric error in the machine, various methods have been proposed. However, an expensive measuring apparatus or a plurality of measuring apparatuses are required for the measurement. The measurement of the above-described error requires a certain degree of workmanship. Then, Japanese Unexamined Patent Application Publication No. 2011-38902 discloses a system where a touch trigger probe is attached to a tool post in a machine, a target ball is installed on a table, the machine automatically performs an index operation of an inclined axis and a rotation axis on a specified index position, a central coordinate of the target ball is measured at each index position, and then, a geometric error is identified and corrected based on its result.

A deformation error caused by an external force, such as a gravity of a jig and a workpiece loaded on the table 3, or by shift in center of gravity of the cradle 4, the trunnion 5, and the like in accordance with operations of the translational axis and the rotation axis is also one of the factors affecting the motion accuracy in this five-axis machine. In order to reduce the deformation error, there is a method to enhance a static rigidity by performing a countermeasure such as increasing a thickness of each component that constitutes the machine. However, this method generates a problem, such as a decrease in velocity and an increase in material costs, due to an increase in a mass of the machine itself.

For such a problem, in a three-dimensional measuring machine in Japanese Unexamined Patent Application Publication No. 2005-214943, a geometric error is measured in state where works having various masses have been preliminarily loaded, a compensation parameter per mass of a work is obtained from its measurement result and stored. A compensation parameter corresponding to the work to be measured is read from the stored parameters as necessary to correct a measured coordinate of the work to be measured.

Japanese Unexamined Patent Application Publication No. 2009-104317 proposes a device that corrects various errors in a simpler configuration by taking various errors, such as a deformation error by an external force, a thermal displacement, and a positioning error, in the machine as geometric errors.

The above-described deformation error varies depending on an assembly accuracy for each machine table. As the machine has been used over a long period of time, its components are abraded, thus changing a behavior of the deformation. In view of this, when a deformation error is estimated based on a deformation error preliminarily measured as in Japanese Unexamined Patent Application Publication No. 2005-214943, an error due to a secular change is caused.

As the system described in Japanese Unexamined Patent Application Publication No. 2011-38902, it is possible to automatically identify the geometric error using a measuring device such as the touch trigger probe for the secular change in the machine. However, it is not possible to identify a deformation error that changes depending on a position of an axis. When a large workpiece has been loaded, it is sometimes not possible to perform a measurement because of an interference of the workpiece with the machine. Further, when a barycentric position of the workpiece is eccentric from the center of the rotation axis, C-axis, the barycentric position moves depending on the position of the C-axis to change the behavior of the deformation, thus not identifying the geometric error.

In Japanese Unexamined Patent Application Publication No. 2009-104317, the deformation error by the external force is assumed to be a function with respect to, for example, the mass and the center of gravity of the workpiece. However, as described above, the behavior of the deformation changes depending on a variation of the machine table and a usage condition of the machine. Thus, it is not possible to accurately estimate the deformation error only by the functions of the mass and the center of gravity of the workpiece.

Therefore, an object of the disclosure is to provide a numerical control device and a numerical control method that ensure machining with high accuracy with respect to various workpieces by estimating a deformation error based on a mass and a barycentric position of a workpiece that are input and identifying the deformation error using a measuring device such as a touch trigger probe in a state where the workpiece has been loaded.

SUMMARY OF THE INVENTION

In order to achieve the above-described object, there is provided a numerical control device for a machine tool according to a first aspect of the disclosure. The numerical control device controls a machine tool having a main spindle for attaching a tool, a table holding a workpiece and a jig, three translational axes, and one or more rotation axes. The numerical control device includes an axis-dependent deformation error estimation unit, an input unit, a gravitational deformation estimation unit, a correction value calculation unit, and an addition unit. The axis-dependent deformation error estimation unit calculates an estimated value of an axis-dependent deformation error caused by a deformation of the machine tool due to operation of at least one of the translational axes and the rotation axes, based on at least an axis-dependent deformation error parameter and command values of the at least one of the translational axes and the rotation axes. The input unit receives a mass and a barycentric position of at least one of the workpiece and the jig. The gravitational deformation estimation unit calculates an estimated value of a gravitational deformation error caused by the mass of the at least one of the workpiece and the jig based on at least a gravitational deformation error parameter, the mass and the barycentric position received at the input unit, and the command values. The correction value calculation unit calculates correction values of the at least one of the translational axes and the rotation axis with respect to an error of at least one of a position and a posture of the tool with respect to the workpiece, based on the estimated value of the axis-dependent deformation error, the estimated value of the gravitational deformation error, and the command values. The addition unit adds the correction values to the command values.

According to a second aspect of the disclosure, in the first aspect of the embodiment, the axis-dependent deformation error estimation means calculates the estimated value of the axis-dependent deformation error using a function of a geometric error of six degrees of freedom of the rotation axes taking the command value of the rotation axes as a variable.

According to a third aspect of the disclosure, in the first aspect of the embodiment, the gravitational deformation estimation means calculates the estimated value of the gravitational deformation error using a function depending on the mass of the at least one of the workpiece and the jig, the barycentric position of the at least one of the workpiece and the jig, and the command value of the rotation axes.

A fourth aspect of the disclosure, in the first aspect of the embodiment, includes an error identification means that measures a position of a target mounted on any one of the main spindle and the table using a measurement means mounted on another of the main spindle and the table and identifies the axis-dependent deformation error parameter based on a three-dimensional coordinate values of a plurality of the measured positions of the target. The axis-dependent deformation error estimation means calculates the estimated value of the axis-dependent deformation error based on the axis-dependent deformation error parameter identified in the error identification means and the command value.

According to a fifth aspect of the disclosure, in the fourth aspect of the embodiment, the error identification means takes at least one of the rotation axes as a motion axis and another of the rotation axes as a fixed axis, positions the fixed axis at two or more fixed positions, positions the motion axis at a plurality of positions at the respective fixed positions, measures a position of the target with the measurement means to obtain respective coordinate values of the position of the target, and identifies the axis-dependent deformation error parameter based on the plurality of coordinate values at the respective fixed positions.

According to a sixth aspect of the disclosure, in the fifth aspect of the embodiment, the error identification means identifies an error of six degrees of freedom regarding the motion axis at the respective fixed positions from the plurality of coordinate values at the respective fixed positions, and identifies the axis-dependent deformation error parameter from the identified error of six degrees of freedom.

According to a seventh aspect of the disclosure, in the fourth aspect of the embodiment, the error identification means calculates an estimated value of a position error of the tool with respect to the workpiece caused by the gravitational deformation error from a difference between a position of the tool with respect to the workpiece estimated when the gravitational deformation error exists and an ideal position of the tool with respect to the workpiece without the gravitational deformation error, and identifies the axis-dependent deformation error parameter using a coordinate value obtained by subtracting the estimated value of the position error from a coordinate value of the target measured by the measurement means.

In order to achieve the above-described object, there is provided numerical control method for controlling a machine tool according to an eighth aspect of the disclosure. The machine tool has a main spindle for attaching a tool, a table holding a workpiece and a jig, three translational axes, and one or more rotation axis. The numerical control method executes an axis-dependent deformation error estimating step of calculating an estimated value of an axis-dependent deformation error caused by a deformation of the machine tool due to operation of at least one of the translational axes and the rotation axes, based on at least an axis-dependent deformation error parameter and command values of the at least one of the translational axes and the rotation axes, a workpiece information obtaining step of obtaining a mass and a barycentric position of at least one of the workpiece and the jig, a gravitational deformation estimating step of calculating an estimated value of a gravitational deformation error caused by the mass of the at least one of the workpiece and the jig, based on at least a gravitational deformation error parameter, the mass and the barycentric position obtained by the workpiece information obtaining step, and the command values, a correction value calculating step of calculating correction values of the at least one of the translational axes and the rotation axis with respect to at least one of an error of a position and a posture of the tool with respect to the workpiece, based on the estimated value of the axis-dependent deformation error, the estimated value of the gravitational deformation error, and the command values, and an adding step of adding the correction values to the command values.

The disclosure can identify the deformation error with the measuring device even when the deformation behavior changes depending on the variation for each machine table and the usage condition of the machine. Even when a large workpiece has been loaded to make difficult to perform the measurement due to the interference, after the deformation error is identified in a measurable state, for example, a state where only the jig has been loaded, the deformation error is estimated from information on the mass and the barycentric position of a jig and a workpiece that have been additionally loaded from that point of time, thus more accurately estimating the deformation error. Further, when the barycentric position of the workpiece is eccentric from the center of the rotation axis, the deformation error that changes depending on the position of the rotation axis can be estimated based on the mass and the barycentric position of the workpiece. The change in the deformation error depending on the position of the rotation axis is also corrected by a correction based on the estimated deformation error. Further, the use of the measuring device can identify the deformation error that was difficult to be estimated.

As described above, the correction of the identified and estimated error ensures the machining with higher accuracy with respect to the various workpieces.

DETAILED DESCRIPTION OF THE INVENTION

The following describes embodiments of the disclosure based on the drawings.

Figure 1:
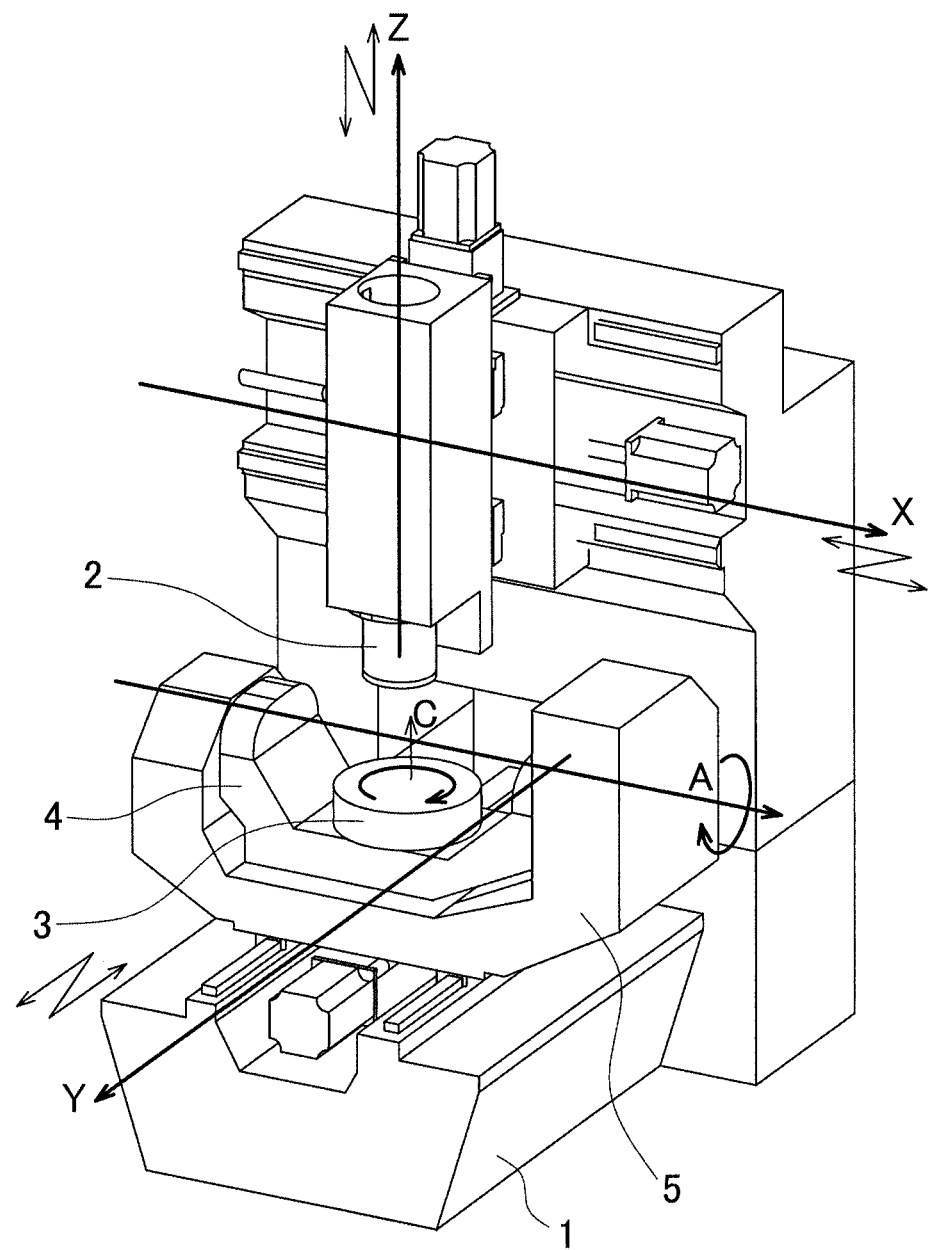
FIG. 1 is a schematic diagram of a five-axis-control machining center.

In an exemplary embodiment of the disclosure, FIG. 1 illustrates a five-axis-control machining center (hereinafter referred to as a "five-axis machine") as an example. This time, an embodiment for a trunnion table type machining center whose axis configuration from a workpiece to a tool is a C-axis, A-axis, Y-axis, X-axis, and Z-axis is taken. However, the disclosure does not limit the machine tool to a machining center and a five-axis machine insofar as a machine tool having three translational axes and at least one rotation axis.

Next, a description will be given of a geometric error.

The geometric error is defined to have total six components ($\delta x$, $\delta y$, $\delta z$, $\alpha$, $\beta$, and $\gamma$) of relative translational errors in three directions and relative rotational errors in three directions between respective axes. In the five-axis machine in this example, a connection of the axes from a workpiece (a material to be worked) fixed to the table 3 to a tool attached to a main spindle of the main spindle head 2 has an order of the C-axis, the A-axis, the Y-axis, the X-axis, and the Z-axis. There are a total of 36 pieces of geometric errors, considering between the Z-axis and the tool, and between the workpiece and the C-axis. However, there are a plurality of ones having redundant relationships among the 36 pieces of geometric errors. Thus, final geometric errors with these ones removed are total 13 pieces: $\delta x5$, $\delta y5$, $\alpha 5$, $\beta 5$, $\delta y4$, $\delta z4$, $\beta 4$, $\gamma 4$, $\gamma 3$, $\alpha 2$, $\beta 2$, $\alpha 1$, and $\beta 1$ when the order from a side of the tool of the respective geometric errors is represented as subscripts. These respective geometric errors mean the X-direction error of the C-axis center position, the offset error between the C and A axes, the angular offset error of the A-axis, the squareness between the C and A axes, the Y-direction error of the A-axis center position, the Z-direction error of the A-axis center position, the squareness between the A and X axes, the squareness between the A and Y axes, the squareness between the X and Y axes, the squareness between the Y and Z axes, the squareness between the Z and X axes, the squareness between the main spindle and the Y-axis, and the squareness between the main spindle and the X-axis.

Figure 2:
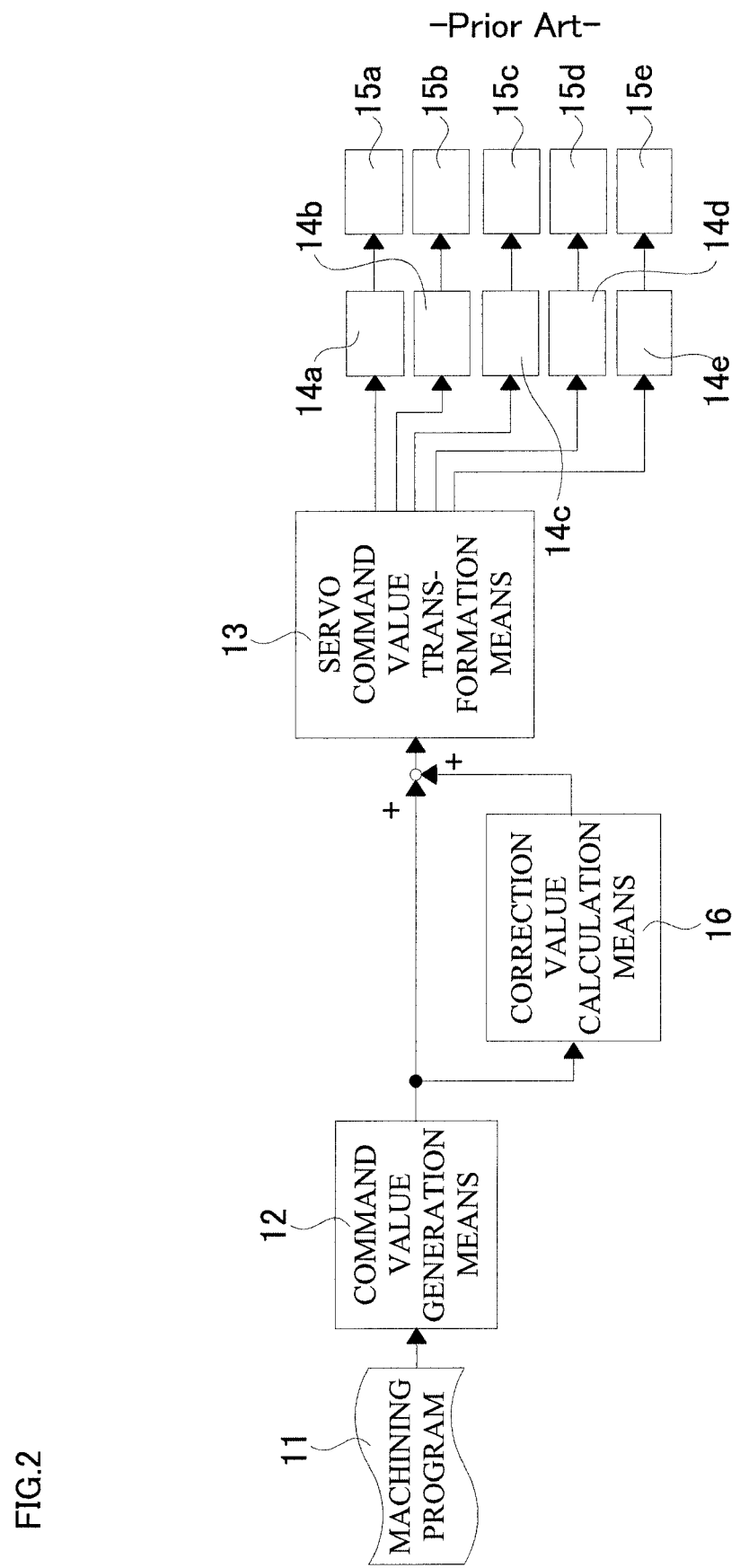
FIG. 2 is a block diagram of a conventional numerical control device.

FIG. 2 illustrates an exemplary conventional numerical control device.

After a machining program 11 is input, command value generation means 12 generates a command value of each drive axis.

Next, correction value calculation means 16 calculates a correction value of each axis based on the generated command value. Then, a total value of the command value and the correction value is transmitted to servo command value transformation means 13 to calculate a servo command value. The servo command values of the respective axes are transmitted to servo amplifiers 14a to 14e of the respective axes. The servo amplifiers 14a to 14e of the respective axes drive servo motors 15a to 15e respectively to control a relative position and posture of the main spindle head 2 with respect to the table 3.

Here, a description will be given of a calculation method of the correction value with respect to the geometric error. In order to transform a tool center point vector $P_T$ in a main spindle coordinate system on the main spindle head 2 into a vector in a workpiece coordinate system on the table 3, when assuming that a length of a tool to be used is t, and command positions of the X, Y, Z, A, and C axes are x, y, z, a, and c respectively, the tool center vector in the workpiece coordinate system can be obtained by performing a homogeneous coordinate transformation using the following formula 1. That is, a tool center point vector $P_1$ in the workpiece coordinate system without the geometric error is obtained.

[Formula 1]

$$P_1 = M_5 \cdot M_4 \cdot M_3 \cdot M_2 \cdot M_1 \cdot P_T$$

where $$M_5 = \begin{bmatrix} \cos c & -\sin c & 0 & 0 \\ \sin c & \cos c & 0 & 0 \\ 0 & 0 & 1 & 0 \\ 0 & 0 & 0 & 1 \end{bmatrix}, M_4 = \begin{bmatrix} 1 & 0 & 0 & 0 \\ 0 & \cos a & -\sin a & 0 \\ 0 & \sin a & \cos a & 0 \\ 0 & 0 & 0 & 1 \end{bmatrix},$$

$$M_3 = \begin{bmatrix} 1 & 0 & 0 & 0 \\ 0 & 1 & 0 & y \\ 0 & 0 & 1 & 0 \\ 0 & 0 & 0 & 1 \end{bmatrix}, M_2 = \begin{bmatrix} 1 & 0 & 0 & x \\ 0 & 1 & 0 & 0 \\ 0 & 0 & 1 & 0 \\ 0 & 0 & 0 & 1 \end{bmatrix}, M_1 = \begin{bmatrix} 1 & 0 & 0 & 0 \\ 0 & 1 & 0 & 0 \\ 0 & 0 & 1 & z \\ 0 & 0 & 0 & 1 \end{bmatrix},$$

$$P_T = \begin{bmatrix} 0 \\ 0 \\ -t \\ 1 \end{bmatrix}$$

On the other hand, as in the following formula 2, a tool center point vector $P_R$ in the workpiece coordinate system with the geometric error is obtained by arranging the respective geometric error as transformation matrices between transformation matrices of the respective axes in the formula 1. The formula 2 is an approximation formula that assumes a product of the geometric errors is 0 taking the geometric errors minute.

$$P_R = \varepsilon_6 \cdot M_5 \cdot \varepsilon_5 \cdot M_4 \cdot \varepsilon_4 \cdot M_3 \cdot \varepsilon_3 \cdot M_2 \cdot \varepsilon_2 \cdot M_1 \cdot \varepsilon_1 \cdot P_T \quad \text{[Formula 2]}$$

where $$\varepsilon_j = \begin{bmatrix} 1 & -\gamma_j & \beta_j & \delta x_j \\ \gamma_j & 1 & -\alpha_j & \delta y_j \\ -\beta_j & \alpha_j & 1 & \delta z_j \\ 0 & 0 & 0 & 1 \end{bmatrix} \quad (j=1, 2, \ldots, 6)$$

Therefore, a position error $\Delta P_W=(\delta x, \delta y, \delta z)$ at a tool center point in the workpiece coordinate system is expressed by the following formula 3.

$$\Delta P_W = P_R - P_I \quad \text{[Formula 3]}$$

Furthermore, an error $\Delta P_O$ on the command value can be obtained by performing a coordinate transformation as in the following formula 4 on the position error $\Delta P_W$ at the tool center point in the workpiece coordinate system.

$$\Delta P_O = M_4^{-1} \cdot M_5^{-1} \cdot \Delta P_W \quad \text{[Formula 4]}$$

Accordingly, a correction value $\Delta P=(\Delta x, \Delta y, \Delta z)$ of the X, Y, and Z axes is obtained in the following formula 5 that takes the command values of the respective axes and the geometric error in the above-described formula as preliminarily measured and identified parameters (geometrical parameters).

$$\Delta P = -\Delta P_O = M_3 \cdot M_2 \cdot M_1 \cdot P_T - M_4^{-1} \cdot M_5^{-1} \cdot \varepsilon_6 \cdot M_5 \cdot \varepsilon_5 \cdot M_4 \cdot \varepsilon_4 \cdot M_3 \cdot \varepsilon_3 \cdot M_2 \cdot \varepsilon_2 \cdot M_1 \cdot \varepsilon_1 \cdot P_T \quad \text{[Formula 5]}$$

When a posture error is corrected, as in the following formula 6, the correction values $\Delta a$ and $\Delta c$ of the rotation axes, A-axis and C-axis are obtained. The correction value $\Delta P=(\Delta x, \Delta y, \Delta z)$ of the X, Y, and Z axes at this time can be obtained as in the following formula 7.

$$\begin{cases} \Delta c = -\sum_{j=5}^{6} \gamma_j \\ \Delta a = -\sum_{j=1}^{5} \alpha_j \end{cases} \quad \text{[Formula 6]}$$

$$\Delta P = -\Delta P_O = M_3 \cdot M_2 \cdot M_1 \cdot P_T - M_4^{-1} \cdot M_5^{-1} \cdot \varepsilon_6 \cdot \xi_C \cdot M_5 \cdot \varepsilon_5 \cdot \xi_A \cdot M_4 \cdot \varepsilon_4 \cdot M_3 \cdot \varepsilon_3 \cdot M_2 \cdot \varepsilon_2 \cdot M_1 \cdot \varepsilon_1 \cdot P_T \quad \text{[Formula 7]}$$

where $$\xi_C = \begin{bmatrix} 1 & -\Delta c & 0 & 0 \\ \Delta c & 1 & 0 & 0 \\ 0 & 0 & 1 & 0 \\ 0 & 0 & 0 & 1 \end{bmatrix}, \quad \xi_A = \begin{bmatrix} 1 & 0 & 0 & 0 \\ 0 & 1 & -\Delta a & 0 \\ 0 & \Delta a & 1 & 0 \\ 0 & 0 & 0 & 1 \end{bmatrix}$$

Thus, the correction values of the respective translational axes are added to the command values of the respective corresponding translational axes to command, thus ensuring the correction of the position error and the posture error at the tool center point due to the geometric error.

On the other hand, when the deformation error due to the external force exists, the deformation error is assumed to be a function $f_G$ that indicate this error with a curved line or a line segment group. The function $f_G$ of the deformation error can be obtained as in the following formula 8 by adding an estimated value $f_{G\_sim}$ and an identified value $f_{G\_idt}$ that are described later. When the function $f_G$ is a discrete value, an interpolation between points is performed with a straight line and a curved line.

$$f_G = f_{G\_sim} + f_{G\_idt} \quad \text{[Formula 8]}$$

This deformation error can be handled as a partial geometric error. For example, when the table 3 deforms by the load of the workpiece, its deformation error can be handled as a geometric error between the C-axis and the A-axis. A tool center point vector $^W P_D$ in the workpiece coordinate system when the deformation error exists can be obtained from the following formula 9.

$$^W P_D = M_5 \cdot \xi_G \cdot M_4 \cdot M_3 \cdot M_2 \cdot M_1 \cdot {}^T P = M_D \cdot {}^T P \quad \text{[Formula 9]}$$

where $$\xi_G = \begin{bmatrix} 1 & -f_{GC} & f_{GB} & f_{GX} \\ f_{GC} & 1 & -f_{GA} & f_{GY} \\ -f_{GB} & f_{GA} & 1 & f_{GZ} \\ 0 & 0 & 0 & 1 \end{bmatrix}$$

Figure 3:
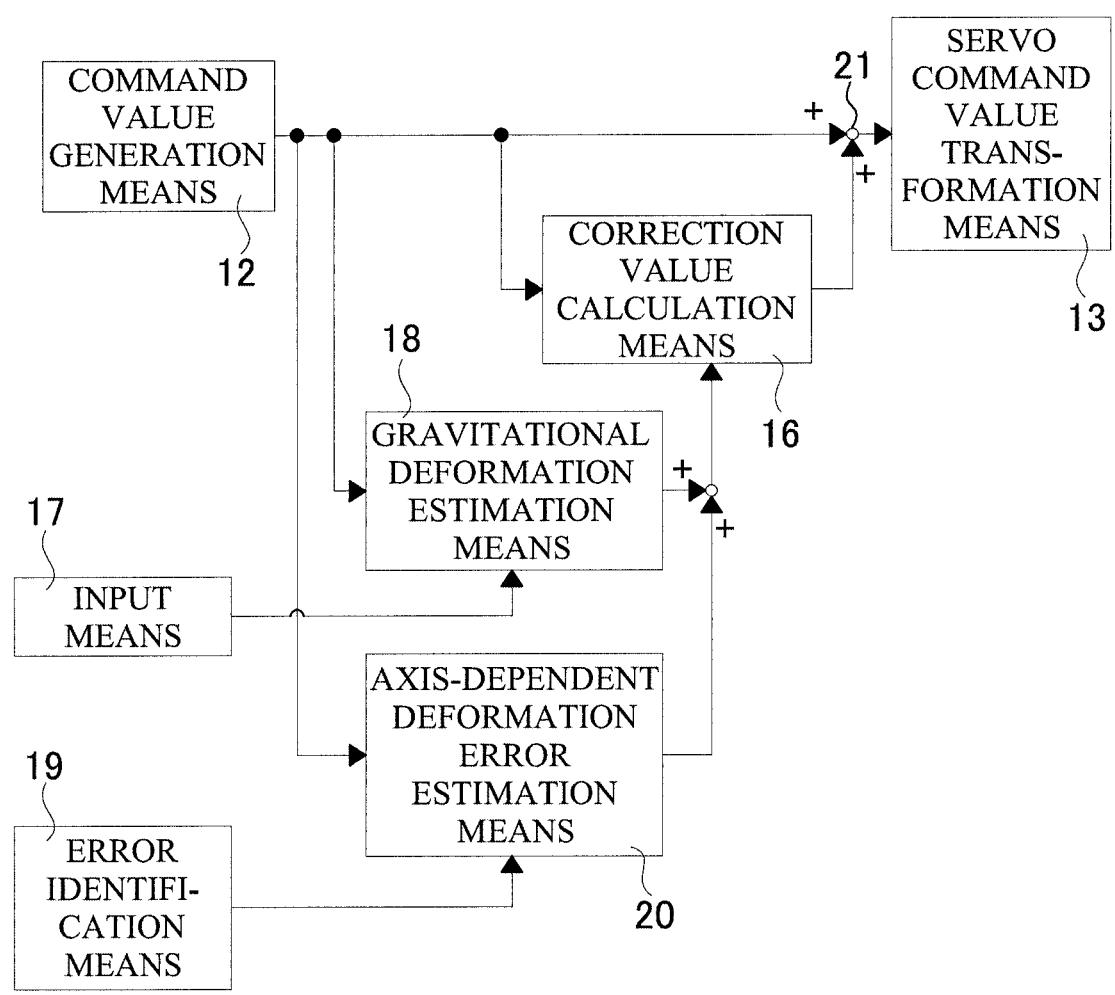
FIG. 3 is a block diagram of a numerical control device that performs a numerical control method of the disclosure.

Next, FIG. 3 illustrates an exemplary numerical control device for performing a numerical control method in the disclosure. The command value generation means 12 and the servo command value transformation means 13 are identical to those in FIG. 2. The machining program 11, the servo amplifiers 14a to 14e, and the servo motors 15a to 15e are omitted for simplification of the drawing.

In this numerical control device, based on the command value calculated by the command value generation means 12, gravitational deformation estimation means 18 and the axis-dependent deformation error estimation means 20 each calculate an estimated value of the deformation error (a gravitational deformation estimating step and an axis-dependent deformation error estimating step). The correction value for the deformation error is obtained by adding the estimated values of the respective deformation errors calculated in the gravitational deformation estimation means 18 and the axis-dependent deformation error estimation means 20 to input its total value to the correction value calculation means 16 (a correction value calculating step). The calculated correction value is added to the command value in an adder 21 as addition means to input it into the servo command value transformation means 13 (an adding step).

A description will be given of a sequence of flows that input the mass and the barycentric position of the workpiece into the gravitational deformation estimation means 18, and calculate the estimated value of the deformation error (hereinafter referred to as a "gravitational deformation error") based on the input mass and barycentric position of the workpiece.

First, input means 17 arranged in the numerical control device inputs a mass $m_w$ and a barycentric position $v_w$ of the workpiece into the gravitational deformation estimation means 18 (a workpiece information obtaining step). The input means 17 includes a method to input the mass and the barycentric position of the workpiece that have been manually input or automatically identified.

The gravitational deformation estimation means 18 calculates the gravitational deformation error in accordance with a function $f_{G\_sim}(a, c, m_w, v_w)$, based on the input mass and barycentric position, and the command value generated in the command value generation means 12. The function $f_{G\_sim}(a, c, m_w, v_w)$ of the deformation error is a function that takes the command values of the A-axis and the C-axis, the mass $m_w$, and the barycentric position $v_w$ as gravitational deformation error parameters. This function is obtained in advance by, for example, an actually measured value and an analytical value.

Next, a description will be given of a sequence of flows that identify the function $f_{G\_idt}$ of the deformation error (hereinafter referred to as an "axis-dependent deformation error function") in the axis-dependent deformation error estimation means 20 based on the geometric error identified in error identification means 19, and calculate the estimated value of the deformation error (hereinafter referred to as an "axis-dependent deformation error").

Figure 4:
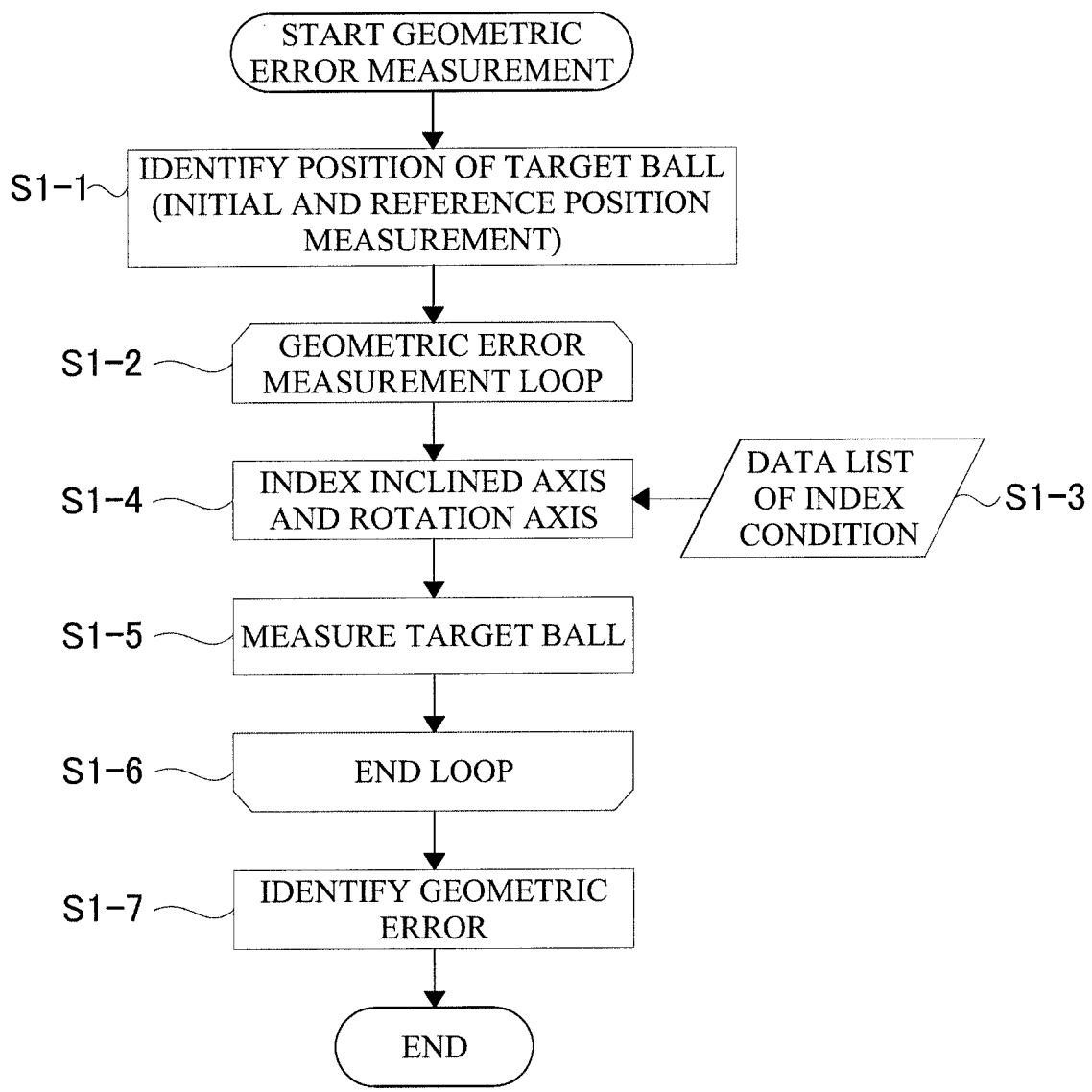
FIG. 4 is a flowchart to identify a geometric error.

FIG. 4 is a sequence of processes that perform a measurement using the measuring device in the error identification means 19 to identify the geometric error.

First, before the measurement of the geometric error, an initial and reference position of a target ball installed on a table is identified by a touch trigger probe as measurement means attached to the main spindle (S1-1).

Next, an index measurement for identifying the geometric error is executed the number of times set under a measurement condition (S1-2).

Next, in accordance with index conditions of a swivel axis (the A-axis) and a rotation axis (the C-axis) preliminarily set by the input means 17 and the like (S1-3), index operations of the A-axis as an inclined axis and the C-axis as the rotation axis are executed (S1-4).

Then, a process (S1-5) to measure a coordinate of the target ball under the respective index conditions is repeated (S1-6). From its result, the geometric error is identified (S1-7).

Next, the following describes details of Step S1-7.

Under one measurement condition, it is assumed that one of the rotation axes is fixed and the other is indexed to a plurality of angles, and the center position of the target ball is measured. Difference vectors of the measurement values at the ball center position with respect to the command values under this measurement condition can be distributed to radial direction, axial direction, and tangent direction components of an index axis. These respective components can be approximated as Fourier series of a zero-order component (radius error), a first-order component (a center deviation), and a second-order component (elliptical shape), namely, an arc with error by, for example, least-square method.

A radial direction component $dRr_i$, an axial direction component $dRa_i$, and a tangential direction component $dRt_i$ of the measurement values at a k-th index angle $\theta_{ijk}$ of a j-th rotation axis under a measurement condition i can be expressed as the following formula 10.

$$dRr_i = ra0_i + ra1_i * \cos(\theta_{ijk}) + rb1_i * \sin(\theta_{ijk}) + ra2_i * \cos(2\theta_{ijk}) + rb2_i * \sin(2\theta_{ijk})$$

$$dRa_i = aa0_i + aa1_i * \cos(\theta_{ijk}) + ab1_i * \sin(\theta_{ijk}) + aa2_i * \cos(2\theta_{ijk}) + ab2_i * \sin(2\theta_{ijk})$$

$$dRt_i = ta0_i + ta1_i * \cos(\theta_{ijk}) + tb1_i * \sin(\theta_{ijk}) + ta2_i * \cos(2\theta_{ijk}) + tb2_i * \sin(2\theta_{ijk})$$ [Formula 10]

The deformation error is handled as the geometric error between the C-axis and the A-axis. An axis-dependent deformation error when an A-axis angle is a is assumed to be $f_{G\_idt}(a)$. When it is assumed that a fixed axis is the A-axis, the index axis is the C-axis, and the A-axis angle under the measurement condition i is an axis-dependent deformation error $f_{G\_idt}(a_i)$ when the geometric error between the C-axis and the A-axis under the measurement condition i, that is, the A-axis angle is $a_i$ is identified as in the following formula 11. Here, H is a coordinate in the Z direction of the target ball center in a table coordinate system (a coordinate system on the table that takes an intersection point of the A and C axes as an origin in an ideal state without the geometric error, and whose X-axis is parallel to the X-axis of the machine).

$$f_{G\_idt\,X}(a_i) = -ra1_i - f_{G\_idt\,B}(a_i) * H$$

$$f_{G\_idt\,Y}(a_i) = rb1_i + f_{G\_idt\,A}(a_i) * H$$

$$f_{G\_idt\,Z}(a_i) = aa0_i$$

$$f_{G\_idt\,A}(a_i) = aa1_i$$

$$f_{G\_idt\,B}(a_i) = aa1_i$$

$$f_{G\_idt\,C}(a_i) = ta0_i$$

Under a plurality of measurement conditions, a geometric error of six degrees of freedom is identified using a function of the geometric error of six degrees of freedom taking the command value of the A-axis as a variable as in the formula 11, thus obtaining the axis-dependent deformation error $f_{G\_idt}(a_i)$ with respect to each A-axis angle $a_i$ under the plurality of measurement conditions. An axis-dependent deformation error function $f_{G\_idt}(a)$ is obtained by interpolating the obtained axis-dependent deformation error $f_{G\_idt}(a_i)$ with respect to each A-axis angle a, with the straight line and the curved line, and by approximating the discrete value with, for example, a trigonometric function.

An example of the approximation with the trigonometric function will be described. When it is assumed that an X-direction component $f_{G\_idt}X(a)$ of the axis-dependent deformation error function can be expressed in a first-order trigonometric function, the X-direction component $f_{G\_idt}X(a)$ of the axis-dependent deformation error function can be expressed as the following formula 12 using X-direction components $\delta x_a$ and $\delta x_b$ of an axis-dependent deformation error parameter.

$$f_{G\_idt\,X}(a) = \delta x_a (1 - \cos(a)) + \delta x_b \sin(a) \quad \text{[Formula 12]}$$

The formula 12 can be solved for the X-direction axis-dependent deformation error parameters $\delta x_a$ and $\delta x_b$ using, for example, the least-square method, by identifying an X-direction axis-dependent deformation error $f_{G\_idt}X(a_i)$ with respect to a plurality of A-axis angles $a_i$. Five components other than the X-direction component are similarly calculated to identify the axis-dependent deformation error parameters of six degrees of freedom.

Thus, the axis-dependent deformation error estimation means 20 calculates the estimated value of the axis-dependent deformation error based on the axis-dependent deformation error parameter identified in the error identification means 19 and the command value. This estimated value is combined with the estimated value of the gravitational deformation error calculated in the gravitational deformation estimation means 18 to input its total value into the correction value calculation means 16, thus obtaining the correction value to be added to the command value.

Thus, according to the numerical control device and the numerical control method of the above-described five-axis machine, the estimated value of the axis-dependent deformation error caused by the deformation of the five-axis machine such that the translational axis and/or the rotation axis operates is calculated based on the axis-dependent deformation error parameter and the command value of the translational axis and/or the rotation axis by the axis-dependent deformation error estimation means 20. The mass and the barycentric position of the workpiece are input by the input means 17. The estimated value of the gravitational deformation error caused by the mass of the workpiece is calculated based on the gravitational deformation error parameter, the mass and the barycentric position received at the input means 17, and this command value by the gravitational deformation estimation means 18. The correction value of the translational axis and/or the rotation axis with respect to the error of the position and/or the posture of the tool with respect to the workpiece is calculated based on the estimated value of the axis-dependent deformation error, the estimated value of the gravitational deformation error, and this command value by the correction value calculation means 16. The correction value is added to the command value by the adder 21.

Thus, the deformation error can be identified with the measuring device even when the deformation behavior changes depending on a variation for each machine table and a usage condition of the machine. For example, when a large workpiece has been loaded to make difficult to perform the measurement with an interference, the deformation error is identified in a measurable state, such as a state where only the jig has been loaded. After the deformation error is identified, information on the mass and the barycentric position of a jig and a workpiece that have been additionally loaded from that point of time is obtained. Based on the information, the deformation is estimated more accurately. Further, when the barycentric position of the workpiece is eccentric from the center of the rotation axis, C-axis, the deformation error that changes depending on the position of the C-axis can be estimated based on the mass and the barycentric position of the workpiece. The change in the deformation error depending on the position of the C-axis is also corrected by a correction based on the estimated deformation error. Further, the use of the measuring device can identify the deformation error that was difficult to be estimated.

As described above, the correction of the identified and estimated error ensures the machining with higher accuracy with respect to the various workpieces.

As another embodiment, a description will be given of an example that identifies the axis-dependent deformation error when the jig and the workpiece are not loaded on the table, by identifying the axis-dependent deformation error excepting the gravitational deformation error $f_{G\_sim}$ in a state where the jig and the workpiece have been loaded on the table.

The position errors of the tool center points in the X, Y, and Z-axes directions caused by the gravitational deformation error $f_{G\_sim}$ are obtained in the following formula 13.

$$\Delta P_{0G\_sim} = \qquad \text{[Formula 13]}$$
$$M_3 \cdot M_2 \cdot M_1 \cdot P_T - M_4^{-1} \cdot \xi_{G\_sim} \cdot M_4 \cdot M_3 \cdot M_2 \cdot M_1 \cdot P_T$$

where $$\xi_{G\_sim} = \begin{bmatrix} 1 & -f_{G\_simC} & f_{G\_simB} & f_{G\_simX} \\ f_{G\_simC} & 1 & -f_{G\_simA} & f_{G\_simY} \\ -f_{G\_simB} & f_{G\_simA} & 1 & f_{G\_simZ} \\ 0 & 0 & 0 & 1 \end{bmatrix}$$

Accordingly, in the error identification means 19, after the position errors of the tool center points in the X, Y, and Z axes directions obtained in the formula 13 are subtracted from the measurement value on the ball center position, the calculation is performed in accordance with the formula 10, the formula 11, and the formula 12. Thus, the axis-dependent deformation error parameter excepting the gravitational deformation error $f_{G\_sim}$ can be identified.

The gravitational deformation error calculated in the gravitational deformation estimation means 18 and the axis-dependent deformation error calculated in the axis-dependent deformation error estimation means 20 are summed as the formula 8 to input its total value into the correction value calculation means 16. Thus, the correction values of the position error and the posture error of the tool center point are calculated. The calculated correction value is added to the command value to correct the position error and the posture error of the tool center point.

In the above-described configuration and the other embodiment, the mass and the barycentric position of the workpiece are input. However, it may be a mass and a barycentric position including the workpiece and the jig, or may be a mass and a barycentric position of only the jig.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A numerical control device for a machine tool, the numerical control device controlling a machine tool having a main spindle for attaching a tool, a table holding a workpiece and a jig, three translational axes, and one or more rotation axes, the numerical control device comprising:

an axis-dependent deformation error estimation unit that calculates an estimated value of an axis-dependent deformation error caused by a deformation of the machine tool due to operation of at least one of the translational axes and the rotation axes, based on at least an axis-dependent deformation error parameter and command values of the at least one of the translational axes and the rotation axes;

an input unit that receives a mass and a barycentric position of at least one of the workpiece and the jig;

a gravitational deformation estimation unit that calculates an estimated value of a gravitational deformation error caused by the mass of the at least one of the workpiece and the jig based on at least a gravitational deformation error parameter, the mass and the barycentric position received at the input unit, and the command values;

a correction value calculation unit that calculates correction values of the at least one of the translational axes and the rotation axes with respect to an error of a position and a posture of the tool with respect to the workpiece, based on at least one of the estimated value of the axis-dependent deformation error, the estimated value of the gravitational deformation error, and the command values; and an addition unit that adds the correction values to the command values, wherein the axis-dependent deformation error estimation unit calculates the estimated value of the axis-dependent deformation error using a function of a geometric error of six degrees of freedom of the rotation axes taking the command value of the rotation axes as a variable.

2. The numerical control device for the machine tool according to claim 1, wherein the gravitational deformation estimation unit calculates the estimated value of the gravitational deformation error using a function depending on the mass of the at least one of the workpiece and the jig, the barycentric position of the at least one of the workpiece and the jig, and the command value of the rotation axes.

3. The numerical control device for the machine tool according to claim 1, the numerical control device further comprising an error identification unit that measures a position of a target mounted on any one of the main spindle and the table using a measurement unit mounted on another of the main spindle and the table and identifies the axis-dependent deformation error parameter based on three-dimensional coordinate values of a plurality of the measured positions of the target, wherein the axis-dependent deformation error estimation unit calculates the estimated value of the axis-dependent deformation error based on the axis-dependent deformation error parameter identified in the error identification unit and the command value.

4. The numerical control device for the machine tool according to claim 3, wherein the error identification unit takes at least one of the rotation axes as a motion axis and another axis of the rotation axes as a fixed axis, positions the fixed axis at two or more fixed positions, positions the motion axis at each of the respective fixed positions, measures a position of the target with the measurement unit to obtain respective coordinate values of the position of the target, and identifies the axis-dependent deformation error parameter based on the plurality of coordinate values at the respective fixed positions.

5. The numerical control device for the machine tool according to claim 4, wherein the error identification unit identifies an error of six degrees of freedom regarding the motion axis at the respective fixed positions from the plurality of coordinate values at the respective fixed positions, and identifies the axis-dependent deformation error parameter from the identified error of six degrees of freedom.

6. The numerical control device for the machine tool according to claim 3, wherein the error identification unit calculates an estimated value of a position error of the tool with respect to the workpiece caused by the gravitational deformation error from a difference between a position of the tool with respect to the workpiece estimated when the gravitational deformation error exists and an ideal position of the tool with respect to the workpiece without the gravitational deformation error, and identifies the axis-dependent deformation error parameter using a coordinate value obtained by subtracting the estimated value of the position error from a coordinate value of the target measured by the measurement unit.

7. A numerical control device for a machine tool, the numerical control device controlling a machine tool having a main spindle for attaching a tool, a table holding a workpiece and a jig, three translational axes, and one or more rotation axes, the numerical control device comprising:

an axis-dependent deformation error estimation unit that calculates an estimated value of an axis-dependent deformation error caused by a deformation of the machine tool due to operation of at least one of the translational axes and the rotation axes, based on at least an axis-dependent deformation error parameter and command values of the at least one of the translational axes and the rotation axes;

an input unit that receives a mass and a barycentric position of at least one of the workpiece and the jig;

a gravitational deformation estimation unit that calculates an estimated value of a gravitational deformation error caused by the mass of the at least one of the workpiece and the jig based on a gravitational deformation error parameter, the mass and the barycentric position received at the input unit, and the command values;

a correction value calculation unit that calculates correction values of the at least one of the translational axes and the rotation axes with respect to an error of a position and a posture of the tool with respect to the workpiece, based on at least one of the estimated value of the axis-dependent deformation error, the estimated value of the gravitational deformation error, and the command values;

an addition unit that adds the correction values to the command values; and an error identification unit that measures a position of a target mounted on any one of the main spindle and the table using a measurement unit mounted on another of the main spindle and the table and identifies the axis-dependent deformation error parameter based on three-dimensional coordinate values of a plurality of the measured positions of the target, wherein the axis-dependent deformation error estimation unit calculates the estimated value of the axis-dependent deformation error based on the axis-dependent deformation error parameter identified in the error identification unit and the command value.

8. The numerical control device for the machine tool according to claim 7, wherein the gravitational deformation estimation unit calculates the estimated value of the gravitational deformation error using a function depending on the mass of the at least one of the workpiece and the jig, the barycentric position of the at least one of the workpiece and the jig, and the command value of the rotation axes.

9. The numerical control device for the machine tool according to claim 7, wherein the error identification unit takes at least one of the rotation axes as a motion axis and another axis of the rotation axes as a fixed axis, positions the fixed axis at two or more fixed positions, positions the motion axis at each of the respective fixed positions, measures a position of the target with the measurement unit to obtain respective coordinate values of the position of the target, and identifies the axis-dependent deformation error parameter based on the plurality of coordinate values at the respective fixed positions.

10. The numerical control device for the machine tool according to claim 9, wherein the error identification unit identifies an error of six degrees of freedom regarding the motion axis at the respective fixed positions from the plurality of coordinate values at the respective fixed positions, and identifies the axis-dependent deformation error parameter from the identified error of six degrees of freedom.

11. The numerical control device for the machine tool according to claim 7, wherein the error identification unit calculates an estimated value of a position error of the tool with respect to the workpiece caused by the gravitational deformation error from a difference between a position of the tool with respect to the workpiece estimated when the gravitational deformation error exists and an ideal position of the tool with respect to the workpiece without the gravitational deformation error, and identifies the axis-dependent deformation error parameter using a coordinate value obtained by subtracting the estimated value of the position error from a coordinate value of the target measured by the measurement unit.

12. A numerical control method for controlling a machine tool having a main spindle for attaching a tool, a table holding a workpiece and a jig, three translational axes, and one or more rotation axes, the numerical control method comprising:

calculating an estimated value of an axis-dependent deformation error caused by a deformation of the machine tool due to operation of at least one of the translational axes and the rotation axes, based on at least an axis-dependent deformation error parameter and command values of the at least one of the translational axes and the rotation axes;

obtaining a mass and a barycentric position of at least one of the workpiece and the jig;

calculating an estimated value of a gravitational deformation error caused by the mass of the at least one of the workpiece and the jig, based on at least a gravitational deformation error parameter, the mass and the barycentric position obtained by the obtaining, and the command values;

calculating correction values of the at least one of the translational axes and the rotation axes with respect to an error of at least one of a position and a posture of the tool with respect to the workpiece, based on the estimated value of the axis-dependent deformation error, the estimated value of the gravitational deformation error, and the command values; and adding the correction values to the command values, wherein the axis-dependent deformation error estimation unit calculates the estimated value of the axis-dependent deformation error using a function of a geometric error of six degrees of freedom of the rotation axes taking the command value of the rotation axes as a variable.

* * * * *